June 22, 1948.   L. A. MILLER   2,443,831
PROTECTIVE GARMENT FOR ANIMALS
Filed April 22, 1947   2 Sheets-Sheet 1
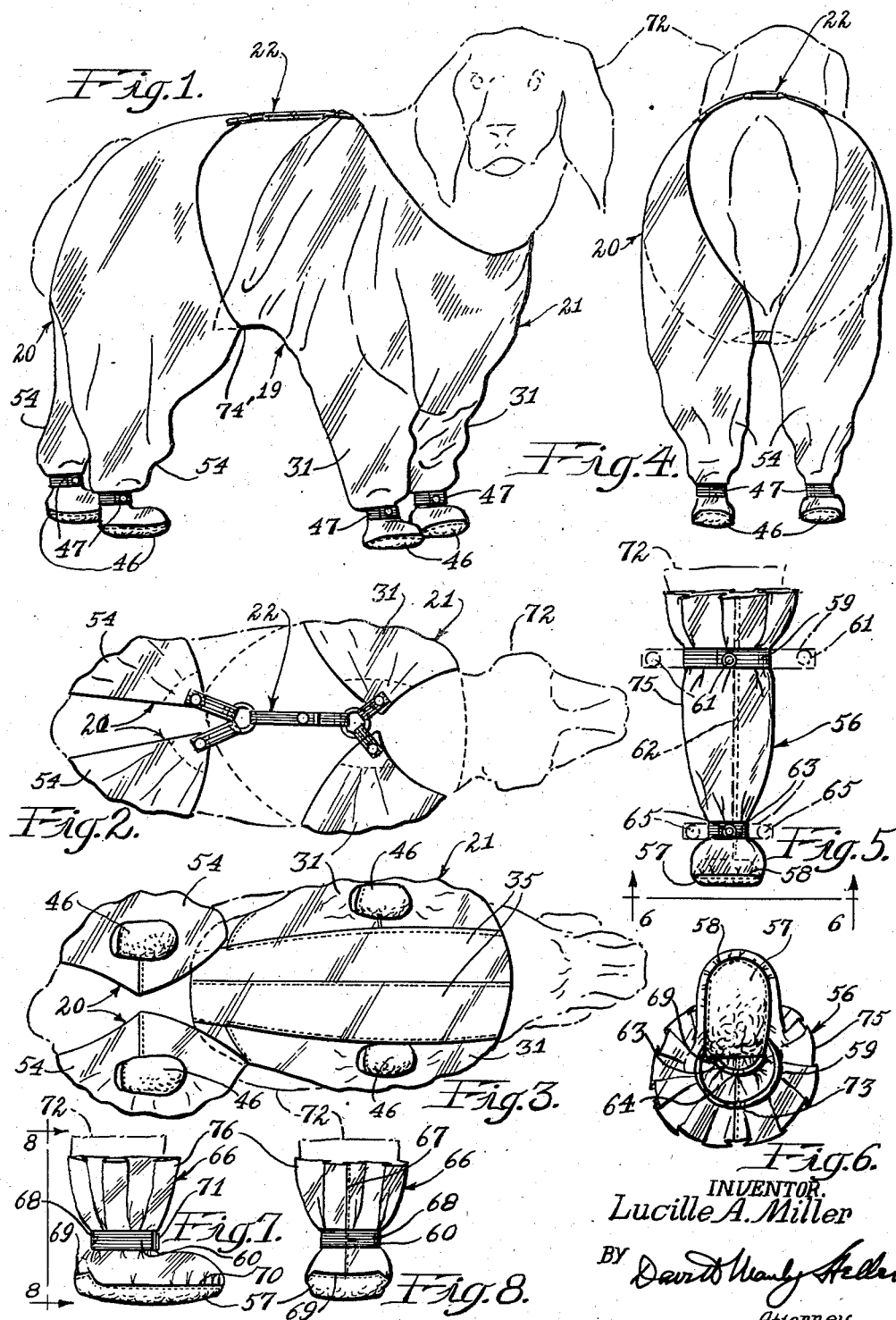
INVENTOR.
Lucille A. Miller
BY
Attorney June 22, 1948.　　　　　L. A. MILLER　　　　　2,443,831
PROTECTIVE GARMENT FOR ANIMALS
Filed April 22, 1947　　　　　　　　　　　　2 Sheets-Sheet 2
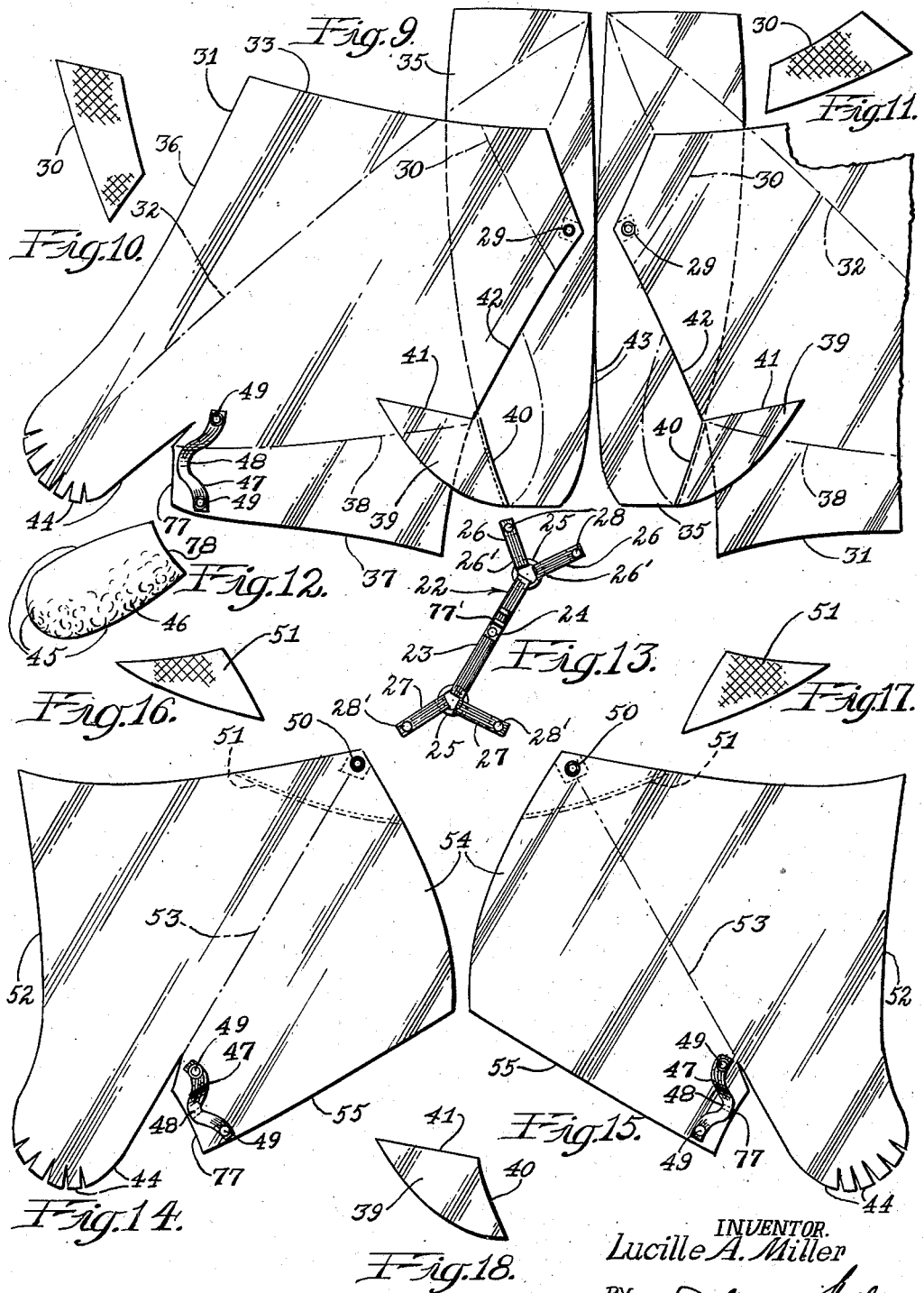
INVENTOR.
Lucille A. Miller
BY
Attorney Patented June 22, 1948

2,443,831

UNITED STATES PATENT OFFICE 2,443,831

PROTECTIVE GARMENT FOR ANIMALS

Lucille A. Miller, Riverside, Ill.

Application April 22, 1947, Serial No. 742,999

3 Claims. (Cl. 54—79)

My invention relates to splashproof garments for animals, particularly dogs or cats, and is made of a waterproof plastic material.

An important object of my invention is to provide a splashproof garment for animals, made in three connecting parts, each made of a waterproof plastic material.

A further object of my invention is to provide a splashproof plastic garment for animals, designed to require a minimum amount of material, to protect the fur of animals on legs and underparts from splashes and soiling contacts while out-of-doors.

A still further object of my invention is to provide a splashproof garment for animals to give complete freedom of movement and to allow them to defecate or urinate.

A still further object of my invention is to provide soles or feet in the said garment made of chamois skin, or other like materials, that are both waterproof and skidproof.

A still further object of my invention is to provide a splashproof garment of plastic material that can be put on, or taken off, the animal quickly and easily.

A still further object of my invention is to provide a splashproof garment of plastic material for animals that can be easily cleaned by merely wiping with a damp cloth.

A still further object of my invention is to provide a splashproof garment for animals that can be folded and carried in a small receptacle, such as a purse, making it available for use when needed.

A still further object of my invention is to provide a splashproof garment for animals, made of a plastic material, that is inexpensive to make and easily produced.

Other objects and advantages inherent in my invention will become apparent from reference to the accompanying drawings, being further elucidated in the ensuing description.

In the illustration,

Fig. 1 represents a side view of an animal; in this case, a dog, wearing the splashproof garment comprising my invention.

Fig. 2 represents the top view of said animal, wearing my invention.

Fig. 3 represents a bottom view looking upwardly at an animal, wearing my invention.

Fig. 4 represents the rear view of the same animal, showing the rear portions of my invention.

Fig. 5 represents features of my invention, embraced in a leg and foot protecting element, or a boot.

Fig. 6 represents a bottom view of Fig. 5 taken on lines 6—6.

Fig. 7 depicts another feature of my invention embraced in a shoe element.

Fig. 8 represents a rear view taken on lines 8—8 of Fig. 7.

Fig. 9 represents a pattern of the front element of my invention, showing it laid out in an assembling position, and showing the relation of the various portions to each other.

Fig. 10 represents a reinforcing gusset of fabric for the left front leg.

Fig. 11 represents a reinforcing gusset of fabric for the right front leg.

Fig. 12 of my invention is the chamois skin sole portion of my invention for the feet thereof.

Fig. 13 represents the harness portion used to connect and hold together the front and rear legs of my invention.

Fig. 14 is a pattern view of the left rear leg of my invention.

Fig. 15 is a pattern view of the right rear leg of my invention.

Fig. 16 is a pattern of the fabric gusset for the left rear leg of my invention.

Fig. 17 is a pattern of the fabric gusset for the right rear leg of my invention.

Fig. 18 is a gore element connecting the belly portion to the front leg element to form an overlapping portion to reach over the forward portion of the rear leg element.

Referring to the drawings, my invention is generally designated 19; 20 designating the rear leg units; 21 designating the front leg unit; while 22 designates the connecting harness. The harness consists of a folded elastic strap 23 to the ends of which are sewed mating snap fasteners 24. Strap 23 encircles and connects the two plastic rings 25. Sewed at 26' to the front ring 25 are two elastic straps 26, each having sewed to it the male part 28 of a snap fastener. Sewed to the rear ring 25 are a second pair of elastic straps 27, having also the male portion 28' of snap fasteners attached to their ends. In assembling, snap fasteners 28 are connected to the female snap fasteners 29 which are sewed to the two symmetrical front legs 31 of my plastic garment 19. The points at which snap fasteners 29 are sewed to legs 31 are reinforced by fabric gussets 30 which are sewed to the underside of legs 31. Front legs 31 are folded at dotted lines 32 and sewed at edges 33 to edges 34 of the belly portions 35 of my garment. After making a second downward fold on line 38 of legs 31, the edges 36 and 37 of legs 31 are sewed together, forming a tapered tubular trouser.

Triangular gores 39 are sewed at 40 to belly portions 35 and, at 41 and 42, to legs 31. The two belly portions 35 are sewed together at 43, thus joining and making complete the front section 21 of my garment 19. The chamois soles 46 are sewed along edge 45 to the pinked lower edges of legs 31 on each of the two front legs 31. Short lengths of elastic tape 47 are sewed at 48 to the lower legs 31 on each of the two front legs, just above the foot. To tapes 47 are sewed male and female snap fasteners 49.

The male snap fasteners 28' of harness 22 are connected to the female snap fasteners 50 of each of the two rear legs 54. Female snap fasteners 50 are reinforced by fabric gussets 51, which are sewed to the undersides of the legs 54 at the point where said snap fasteners 50 are attached.

Rear legs 54 are folded at 53 and sewed at edges 52 and 55, resulting in a tubular trouser-like shape. Chamois skin soles 46 are sewed on the edges 45 to the pinked edges 44 of the legs 54 and also attached to the lower portion of legs 54 are short lengths of elastic tape 47, sewed at 48, and having at each end male and female snap fasteners 49. The edges 77 of the front leg unit 31 and of the rear leg units 54 are sewed to the edges 78 of soles 46.

To place garment, generally designated 19, on animal designated 72: Into the rear legs 54 of my garment 20, are inserted the two hind legs of the animal 72, and the tapes 47 are drawn around the ankles of the animal 72 and secured by snap fasteners 49. The two rear legs 20 having been separately put on the animal 72, the front legs of animal 72 are inserted into the legs 31 of the front section 21 of my splashproof garment 19, drawing the legs of the animal well into the leg units 31 of my garment, and then fastening the tape 47 by means of snap fasteners 49 around the lower portions of the front legs of the animal. Then, by means of snap fasteners 28, 29, 28' and 50, the two sections 20 and 21 of my garment 19 are brought together and connected over the back of the animal 72 by means of the harness 22, which is adjustable by means of buckle 77'.

The previously described gores 39 of the front section 21 of my invention are so designed to extend backward to be overlapped by the forward portion of the rear legs 54 of section 20, covering the belly of the animal, as shown at 74', thus giving complete protection from splash to the undersides of the coat of the animal. If desirable, snap fasteners 28' and 50 may be left permanently attached holding the two rear legs 54 together and making it only necessary to snap the fasteners 28 and 29 to dress animal 72 in the garment.

Figs. 5 and 6, generally designated 56, consists of a boot of plastic material 75 sewed together at 62, having attached thereto an elastic tape 59 sewed at 73 to the upper portion of the boot 75, and having attached snap fasteners 61. A second elastic tape 63 is sewed at 64 just above the foot of boot 75 and has snap fasteners at 65 for the purpose of holding the boot 75 on the leg of the animal 72.

The garment may be made optionally with separable boots or shoes like those illustrated at Figs. 5, 6, 7, and 8, in which the plastic material 75 of the boot 56 in Fig. 5 is sewed together at 62 and sewed to chamois skin soles 57 at 58 and 69. An elastic strap 59 is sewed at 73 to boot 56 and male and female snap fasteners 61 are attached to the two ends thereof. A second elastic strap 63 is sewed at 64 to the lower part of boot 75 and to the ends of this strap are attached male and female snap fasteners 65.

The plastic material 76 of shoe 66, shown in Fig. 7, is sewed together at 67 and is also sewed at 69 and 70 to chamois skin sole 57. An elastic strap 60 is sewed at 68 to the shoe 66, and to its ends are attached male and female snap fasteners 71.

Although various possible embodiments of the above invention might be made, and since various changes might be made in the embodiments above set forth, it is to be understood that all matter herein set forth, or shown in the accompanying drawings, is to be interpreted as illustrative and not in a limiting or restricted sense.

Having thus disclosed and revealed my invention, what I claim as novel, and desire to secure by Letters Patent, is:

1. A protective waterproof garment for animals comprising, a front section fitted over the forelegs of an animal, a rear section consisting of two separate elements each fitted over a hind leg of the said animal, a harness for uniting the said front and rear sections at the spinal part of the body of the said animal, and snap fastener means securing removably the said front and rear sections to the said harness, the said front section being provided with trouser-like portions, each of the said elements of the said rear section being also provided with trouser-like portions, all of the aforesaid trouser-like portions terminating in shoe portions having waterproof non-skid sole portions, and fastening straps secured at the ankle portions of the said shoe portions and provided with snap fastening means constructed and arranged to encompass the ankles of the said animal.

2. A protective waterproof garment for animals comprising, a front section fitted over the forelegs of an animal, a rear section consisting of two separate elements each fitted over a hind leg of the said animal, an elastic harness for uniting the said front and rear sections at the spinal part of the body of the said animal, and snap fastener means securing removably the said front and rear sections to the said harness, the said front section being provided with trouser-like portions, each of the said elements of the said rear section being also provided with trouser-like portions, all of the aforesaid trouser-like portions terminating in shoe portions having waterproof non-skid sole portions, and elastic fastening straps secured at the ankle portions of the said shoe portions and provided with snap fastening means constructed and arranged to encompass the ankles of the said animal.

3. A protective waterproof garment for animals comprising, a front section fitted over the forelegs of an animal, a rear section consisting of two separate elements each fitted over a hind leg of the said animal, an elastic harness for uniting the said front and rear sections at the spinal part of the body of the said animal, and snap fastener means securing removably the said front and rear sections to the said harness, the said front section being provided with trouser-like portions, each of the said elements of the said rear section being also provided with trouser-like portions, all of the aforesaid trouser-like portions terminating in shoe portions having waterproof non-skid sole portions, and elastic fastening straps secured at the ankle portions of the said shoe portions and provided with snap fastening means constructed and arranged to encompass the ankles of the said animal, the said garment allowing full freedom of movement to the said animal at the same time affording openings permitting urination and defecation.

LUCILLE A. MILLER.

REFERENCES CITED

The following references are of record in the file of this patent:

UNITED STATES PATENTS

| Number | Name | Date |
|---|---|---|
| 438,105 | Geyer | Oct. 7, 1890 |

FOREIGN PATENTS

| Number | Country | Date |
|---|---|---|
| 357,846 | Italy | Mar. 29, 1938 |